(12) United States Patent
Zhou

(10) Patent No.: US 8,553,048 B2
(45) Date of Patent: Oct. 8, 2013

(54) METHOD AND SYSTEM FOR PROCESSING PICTURE

(75) Inventor: Jun Zhou, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 307 days.

(21) Appl. No.: 12/729,622

(22) Filed: Mar. 23, 2010

(65) Prior Publication Data

US 2010/0182327 A1  Jul. 22, 2010

Related U.S. Application Data

(63) Continuation of application No. PCT/CN2008/072087, filed on Aug. 21, 2008.

(30) Foreign Application Priority Data

Sep. 24, 2007  (CN) .......................... 2007 1 0151326

(51) Int. Cl.
G09G 5/00 (2006.01)
G06T 13/00 (2011.01)
G06K 15/00 (2006.01)

(52) U.S. Cl.
USPC .................... 345/619; 345/473; 358/1.18

(58) Field of Classification Search
USPC ......................... 345/619, 473, 629
See application file for complete search history.

(56) References Cited

U.S. PATENT DOCUMENTS

| 7,184,061 B2 * | 2/2007 | Rao ............................... 345/629 |
| 2006/0036949 A1 * | 2/2006 | Moore et al. .................. 715/730 |
| 2007/0024908 A1 * | 2/2007 | Hanechak ................... 358/1.18 |

FOREIGN PATENT DOCUMENTS

| CN | 1570968 A | 1/2005 |
| CN | 1571479 A | 1/2005 |
| CN | 101118649 A | 2/2008 |

OTHER PUBLICATIONS

MegaView, http://web.archive.org/web/20061109150446/http://www.xequte.com/download/help/megaview.pdf, Nov. 9, 2006.*
Google translation of CN 1571479 A.*
English-language translation of First Office Action for Chinese Application No. 200710151326.4, dated Feb. 6, 2009.
English-language translation of Second Office Action for Chinese Application No. 200710151326.4, dated Jul. 24, 2009.

* cited by examiner

*Primary Examiner* — Tize Ma
*Assistant Examiner* — Yingchun He
(74) *Attorney, Agent, or Firm* — Marshall, Gerstein & Borun LLP

(57) ABSTRACT

Embodiments of the present invention provide a method for processing the pictures, including: decomposing a dynamic picture frame into multiple static picture frames; bonding each of the static picture frames with a static original picture to generate multiple static pictures; and forming a dynamic picture with the multiple static pictures. Embodiments of the present invention further provide a system for processing the pictures, including a decomposing unit, a bonding unit and a composing unit. The decomposing unit is configured to decompose a dynamic picture frame into multiple static picture frames; the bonding unit is configured to bond each of the static picture frames with a static original picture to generate multiple static pictures; and the composing unit is configured to form a dynamic picture with the multiple static pictures. By processing the pictures with the technical solution provided by embodiments of the present invention, pictures may possess a sense of action and good expressive force, and may better display the personality of the user.

11 Claims, 4 Drawing Sheets

METHOD AND SYSTEM FOR PROCESSING PICTURE

CROSS-REFERENCE TO RELATED APPLICATIONS

This is a continuation of International Application No. PCT/CN2008/072087, filed Aug. 21, 2008, which in turn claims the priority benefit of Chinese Patent Application No. 200710151326.4 filed Sep. 24, 2007, the entire respective disclosures of which are incorporated herein by reference.

TECHNICAL FIELD

The present invention relates to picture processing technologies, and more particularly, to a method and device for processing pictures.

BACKGROUND OF THE INVENTION

With the development of networks, releasing pictures for sharing on web pages becomes more and more fashionable. For showing themselves, many young people like to put, e.g., pictures taken by themselves, or pictures obtained through cutting or photomontage technologies, on web pages to share these photos with friends. It is necessary to add beautiful picture frames to pictures for decoration, to make released pictures more personalized and beautiful.

With reference to FIG. 1, FIG. 1 is a flow chart illustrating a method for processing dynamic pictures in accordance with a conventional method. The specific steps are as follows.

Block 101: Select a picture frame.

A picture frame that fits a picture is selected from a file storing picture frames. The "fit" refers to that picture elements and the type of borders in the picture frame are in harmony with the picture. For example, it is appropriate to select a picture frame with a landscape picture element for a picture with character as its main element. Meanwhile, it is appropriate to select a picture frame with cartoon borders for a picture with pets as its main element.

Block 102: Adjust the selected picture frame.

The size of the picture frame is adjusted according to the size of the picture, to make the picture frame fit the picture. For example, if the size of the picture is 100 mm*100 mm, the size of the selected picture frame is 300 mm*200 mm, it is necessary to respectively reduce the length and width of the picture frame to ⅓ and ½ of the initial values. For example, if the size of the picture is 300 mm*200 mm, the size of the selected picture frame is 100 mm*100 mm, it is necessary to respectively enlarge the length and width of the picture frame to 3 times and 2 times of the initial values.

Block 103: Bond the adjusted picture frame with the picture.

The adjusted picture frame is bonded with the picture, to obtain a static picture.

A static picture is generated after processing the picture using the above-mentioned method. Although the static picture obtained after the processing is beautiful, it lacks a sense of action and good expressive force on the network, and can not show the personality of the user well.

When processing the picture frame with the above-mentioned method, it is necessary to perform simple reduction and enlargement on the picture frame, to make size of the picture frame fit that of the picture. If the reduction or enlargement ratio of the length of the picture frame is not consistent with that of the width of the picture frame, it is likely to make the picture elements in the picture frame distorted, and subsequently affect beauty of the picture frame.

SUMMARY OF THE INVENTION

A technical problem to be solved by embodiments of the present invention is to provide a method for processing pictures, to make pictures possess a sense of action and good expressive force, to better display the personality of the user.

Embodiments of the present invention further provide a system for processing pictures, to make pictures possess a sense of action and good expressive force, to better display the personality of the user.

The present invention relates to a method for processing pictures, including:

decomposing a dynamic picture frame into multiple static picture frames;

bonding each of the static picture frames with a static original picture to generate multiple static pictures; and forming a dynamic picture with the multiple static pictures.

Embodiments of the present invention also provide a system for processing pictures, which includes a decomposing unit, a bonding unit and a composing unit, the decomposing unit is configured to decompose a dynamic picture frame into multiple static picture frames;

the bonding unit is configured to bond each of the static picture frames with a static original picture to generate multiple static pictures; and the composing unit is configured to form a dynamic picture with the multiple static pictures.

Embodiments of the present invention possess the following advantages compared with the conventional method.

In accordance with embodiments of the present invention, the method for processing the pictures includes: decomposing a dynamic picture frame into multiple static picture frames; bonding each of the static picture frames with a static original picture to generate multiple static pictures; and forming a dynamic picture with the multiple static pictures. Compared with the static picture obtained with the conventional method, the dynamic picture may dynamically display above-mentioned static pictures, may possess a sense of action and good expressive force, and may better display the personality of the user.

BRIEF DESCRIPTIONS OF THE DRAWINGS

DETAILED DESCRIPTION OF THE INVENTION

To make above objectives, features and advantages of the present invention more clear, further detailed descriptions for the present invention are provided hereinafter accompanying with drawings and embodiments.

In the embodiments of the present invention, a selected dynamic picture frame is decomposed into picture frames; each of the picture frames is bonded with a static original picture to form a dynamic picture. Specifically speaking, the dynamic picture frame is first decomposed into multiple frames, in which each of the multiple frames is a static picture frame; each static picture frame is respectively bond with the static original picture to generate multiple static pictures; the generated multiple static pictures form the dynamic picture.

Figure 1:
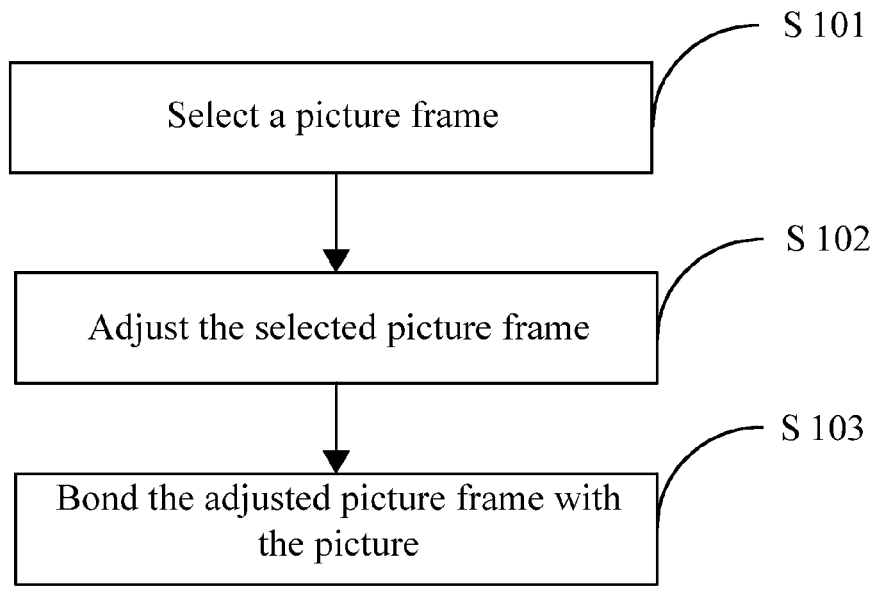
FIG. 1 is a flow chart illustrating a method for processing dynamic pictures in accordance with a conventional method.
Figure 2:
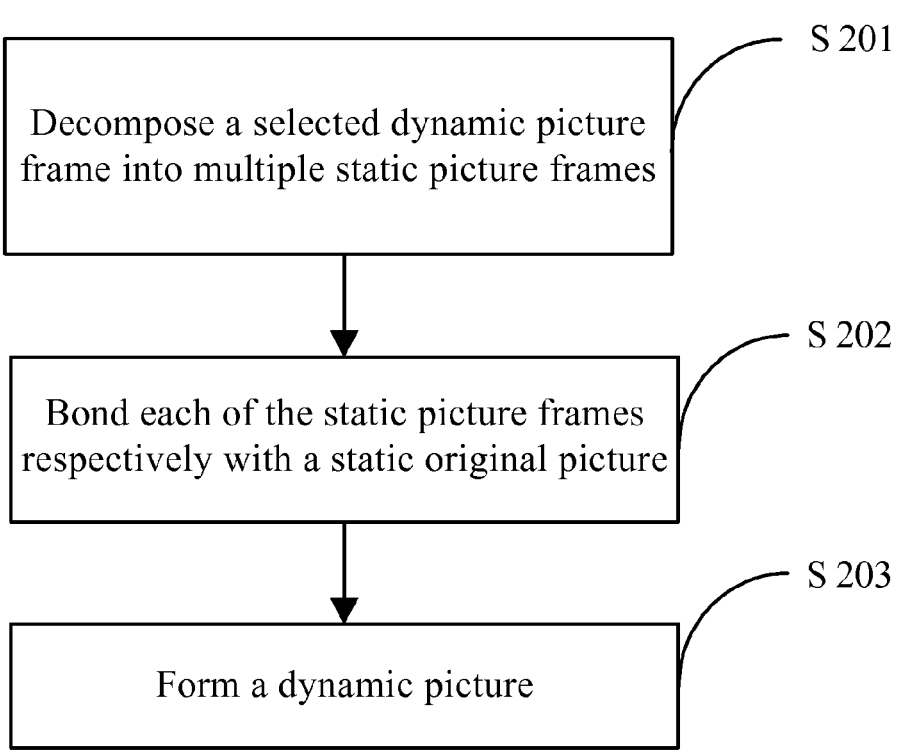
FIG. 2 is a flow chart illustrating a method for processing pictures in accordance with a first embodiment of the present invention.

With reference to FIG. 2, FIG. 2 is a flow chart illustrating a method for processing pictures in accordance with the first embodiment of the present invention. The specific steps are as follows.

Block S201: Decompose a selected dynamic picture frame into multiple static picture frames.

A dynamic picture frame is selected. The dynamic picture frame includes borders and multiple internal picture elements. Each internal picture element displays a different pattern. The selected dynamic picture frame is decomposed into multiple frames, each of which is a static picture frame. Each static picture frame includes borders and a picture element.

Block S202: Bond each of the static picture frames respectively with a static original picture to generate a picture sequence.

In the embodiment, the static original picture bonded with each of the static picture frames is a same static original picture. Alternatively, when there is at least one static original picture bonded with the static picture frames, the number of the at least one static original picture bonded with the static picture frames is the same as that of the static picture frames. Each static original picture is respectively bond with each static picture frame to generate multiple static pictures.

The size of each of the above static picture frames is processed to make it fit each static original picture, and each of the static picture frames is respectively bond with the static original picture to form multiple static pictures. The generated multiple static pictures form a picture sequence. After being bonded, the borders of the picture frame are taken as the borders of the static picture and the picture sequence, and the picture elements in the picture frame are taken as the background or complementary patterns of the static picture and the picture sequence.

The static original picture refers to a static source picture. The static original picture includes a character picture, landscape picture, and nature picture, etc.

Block S203: Form a dynamic picture with the above picture sequence.

The above picture sequence is combined to form the dynamic picture in the format of GIF or FLASH.

The dynamic picture frame is decomposed into the static picture frames. The static picture frames are respectively bond with the static original picture to form a dynamic picture. The static original picture is respectively bond with the internal picture elements in the dynamic picture frame, to form a dynamic picture constituted of pictures with different backgrounds or complementary patterns. The dynamic picture dynamically displays the above pictures. The dynamic picture possesses a sense of action and good expressive force, and may better display the personality of the user.

In order to make the formed dynamic picture not distorted and deformed, the embodiments of the present invention process the borders and internal picture elements of each static picture frame before bonding each of the static picture frames with the static original picture.

Figure 3:
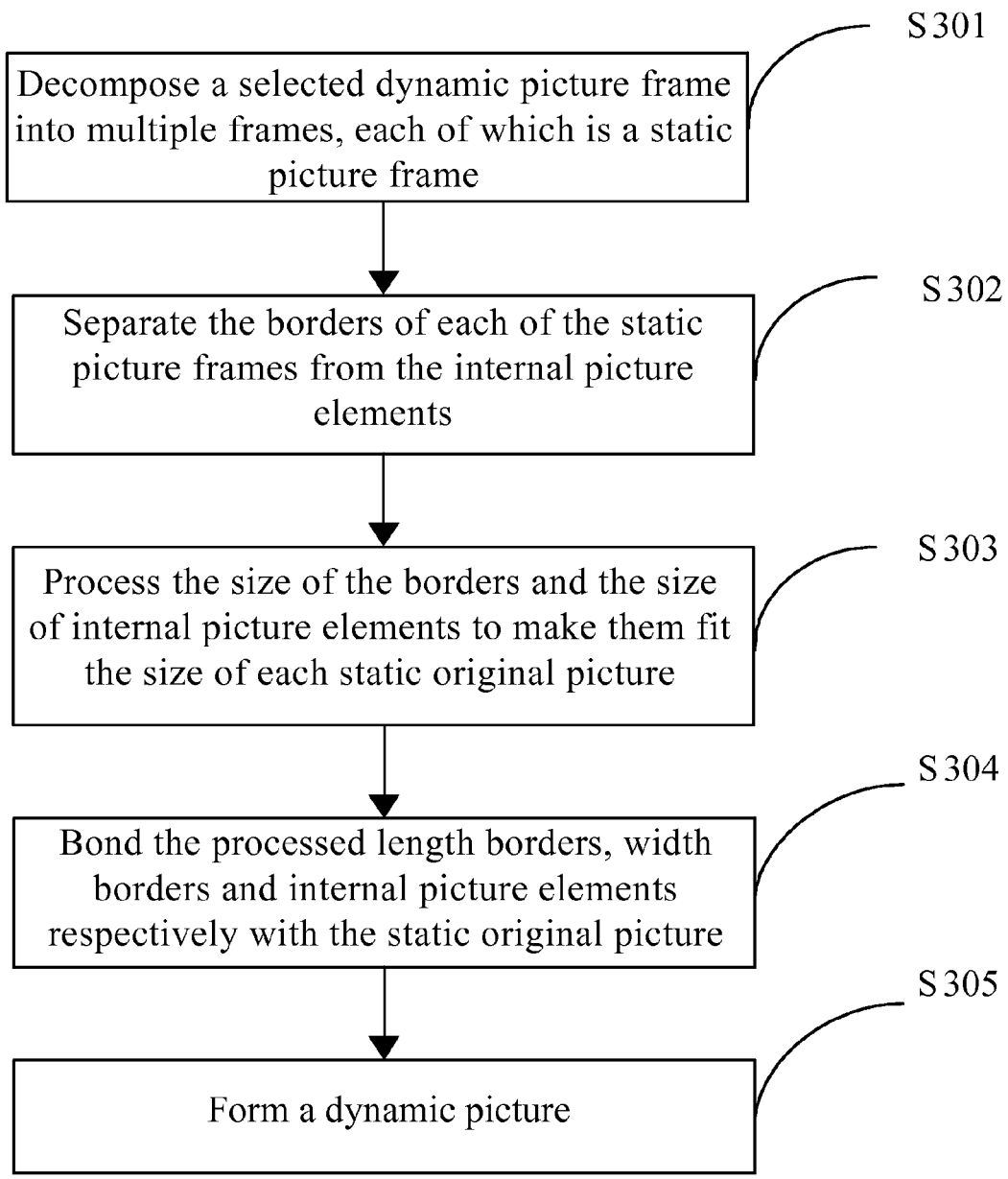
FIG. 3 is a flow chart illustrating a method for processing pictures in accordance with a second embodiment of the present invention.

With reference to FIG. 3, FIG. 3 is a flow chart illustrating a method for processing pictures in accordance with the second embodiment of the present invention. The specific steps are as follows.

Block S301: Decompose a selected dynamic picture frame into multiple frames, each of which is a static picture frame.

A dynamic picture frame is selected. The dynamic picture frame includes borders and multiple internal picture elements. Each internal picture element displays a different pattern. The selected dynamic picture frame is decomposed into multiple frames, each of which is a static picture frame. Each static picture frame includes borders and a picture element.

Block 302: Separate the borders of each of the static picture frames from the internal picture elements.

Four borders and the internal picture elements of each of the above static picture frames are divided into several independent parts such as, three parts which are respectively length borders, width borders and the internal picture elements.

Block 303: Process the size of the borders and the size of the internal picture elements of each static picture frame to make them fit the size of each static original picture corresponding to each static picture frame.

The size of each border is processed to make it fit the size of the static original picture. For example, the original length border is 10 mm, original width border is 8 mm, and the size of the static original picture is 6 mm*6 mm. The original length border is reduced to 6 mm, and then the original width border is reduced to 6 mm. The internal picture elements are reduced according to the larger proportion, that is, the internal picture elements are reduced to 0.6 time of the original size. For example, the original length border is 8 mm, original width border is 6 mm, and the size of the static original picture is 8 mm*10 mm. The original length border is enlarged to 10 mm, the original width border is enlarged to 8 mm, the internal picture elements are enlarged according to the smaller proportion, e.g., the internal picture elements are enlarged to $\frac{5}{4}$ time of the original size.

Block S304: Bond the processed length borders, width borders and internal picture elements of each static picture frame respectively with the static original picture.

In the embodiment, the static original picture bonded with each of the static picture frames is a same static original picture. Alternatively, the number of the static original pictures bonded with the static picture frames is the same as that of the static picture frames. Each static original picture is respectively bond with each static picture frame to generate multiple static pictures.

The processed length border, width border and internal picture elements of each static picture frame are respectively bonded with the static original picture, to form a picture sequence. After being bonded, the borders of the picture frame are taken as the borders of the picture sequence. The internal picture elements of the picture frame are taken as the background or complementary patterns of the picture sequence.

Block S305: Form a dynamic picture.

The above picture sequence is combined to form the dynamic picture in the format of GIF or FLASH.

In the embodiments of the present invention, each static picture frame is decomposed into the length borders, width borders and internal picture elements. The length borders, width borders and internal picture elements are adjusted and then combined with the static original picture. During the adjustment, each part of each static picture frame is adjusted according to a certain proportion. The adjusted borders may be well bonded with the borders and angles of the static original picture. Since the internal picture elements are adjusted according to a certain proportion, which will not make the internal picture elements deformed and distorted. It is avoided that the picture frame is simply adjusted according to the size of the picture and the picture frame is made distorted and deformed due to the non-uniform of the adjustment proportion. Thus, the original beauty of the picture frame may be effectively guaranteed.

In the embodiments of the present invention, a time attribute and size attribute of each static picture frame may be utilized, to make the formed dynamic picture more beautiful, coordinated, and have better visual effects.

Figure 4:
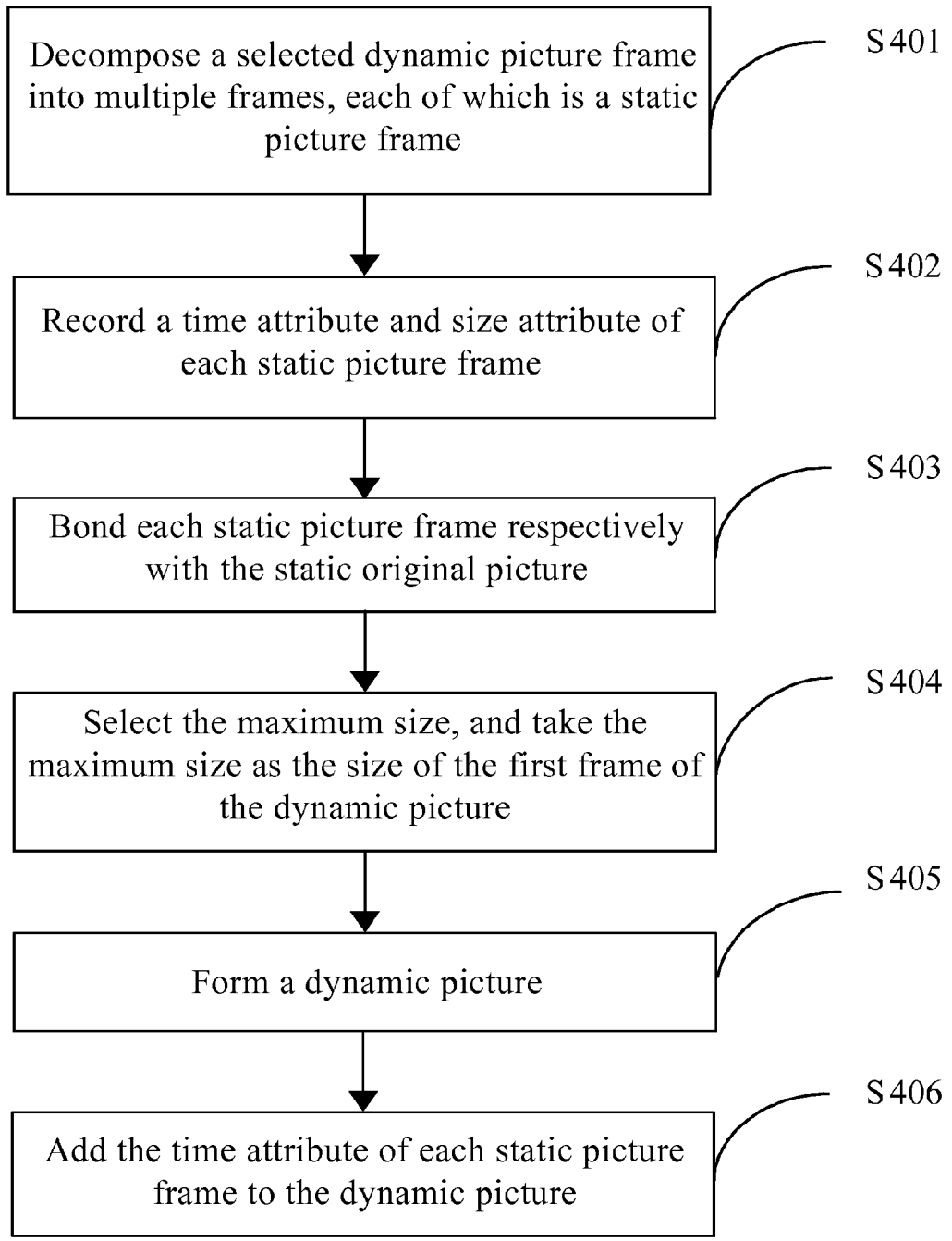
FIG. 4 is a flow chart illustrating a method for processing pictures in accordance with a third embodiment of the present invention.

With reference to FIG. 4, FIG. 4 is a flow chart illustrating a method for processing pictures provided by the third embodiment of the present invention. The specific steps are as follows.

Block S401: Decompose a selected dynamic picture frame into multiple frames, each of which is a static picture frame.

In the embodiment, the static original picture bonded with each of the static picture frames is a same static original picture. Alternatively, the number of the static original pictures bonded with the static picture frames is the same as that of the static picture frames. Each static original picture is respectively bond with each static picture frame to generate multiple static pictures.

A dynamic picture frame is selected. The dynamic picture frame includes borders and multiple internal picture elements. The selected dynamic picture frame is decomposed into multiple frames, each of which is a static picture frame. Each static picture frame includes borders and a picture element.

Block S402: Record a time attribute and size attribute of each static picture frame.

The time attribute of each static picture frame above is recorded, that is, the time interval e.g., 5 ms, 6 ms, 10 ms, etc. between this static picture frame and the previous one is recorded. The size attribute of each static picture frame above is recorded, that is, the size of the static picture frame, e.g., 5 mm*7 mm, 7 mm*9 mm, 4 mm*8 mm, etc.

Block S403: Bond each static picture frame respectively with the static original picture.

The size of each of the above static picture frames is processed to make the size of them fit each static original picture, and each of the static picture frames is respectively bond with the static original picture to form multiple static pictures. The generated multiple static pictures form a picture sequence. The borders of picture frame are taken as the borders of the static picture and the picture sequence, and the picture elements of the picture frame are taken as the background of the static picture and the picture sequence.

Block S404: Select the maximum size from the size attribute of each static picture frame, and take the maximum size as the size of the first frame of the dynamic picture.

The size of each static picture frame above is compared with one another, and the maximum size is selected and taken as the size of the first frame of the dynamic picture, e.g., selecting 7 mm*9 mm as the picture size of the first frame of the dynamic picture.

Block S405: Form a dynamic picture.

The above picture sequence is combined to form the dynamic picture in the format of GIF or FLASH.

Block S406: Add the time attribute of each static picture frame to the time attribute of corresponding static picture in the above dynamic picture.

Each frame of the dynamic picture is displayed in sequence according to the time interval in the time attribute after adding the time attribute of each static picture frame to the dynamic picture.

The beauty of the dynamic picture may be guaranteed to a large extent by taking the maximum size of each static picture frame in the dynamic picture frame as the size of the first frame of the dynamic picture. The time attribute of each static picture frame in the dynamic picture frame is taken as the time attribute of each frame of the dynamic picture, which makes the time interval for displaying each frame of the dynamic picture be the same as that of the dynamic picture frame, and makes the dynamic picture more coordinated, and have better visual effects.

In accordance with embodiments of the present invention, when processing the dynamic picture into the FLASH format, special switching effects may be added between each frame of picture, to make the dynamic picture have better dynamic effects and personality.

Figure 5:
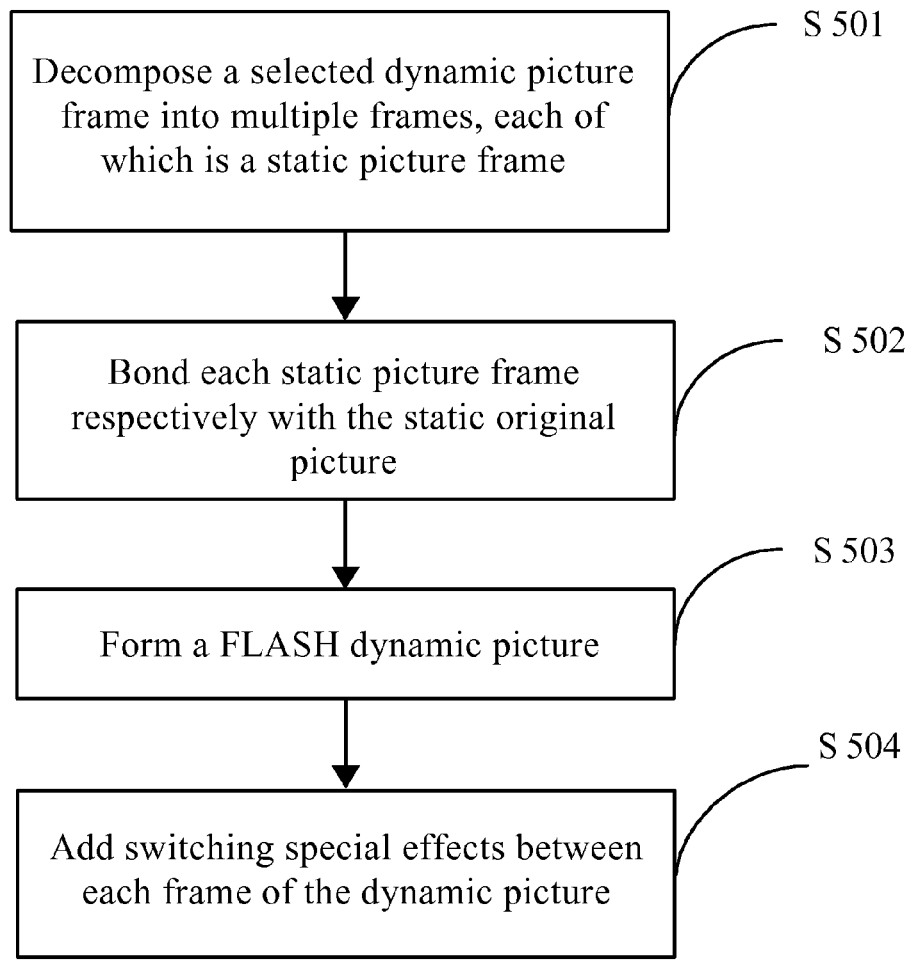
FIG. 5 is a flow chart illustrating a method for processing pictures in accordance with a fourth embodiment of the present invention.

With reference to FIG. 5, FIG. 5 is a flow chart illustrating a method for processing pictures provided by the fourth embodiment of the present invention. The specific steps are as follows.

Block S501: Decompose a selected dynamic picture frame into multiple frames, each of which is a static picture frame.

A dynamic picture frame is selected. The dynamic picture frame includes borders and multiple internal picture elements. The selected dynamic picture frame is decomposed into multiple frames, each of which is a static picture frame. Each static picture frame includes borders and a picture element.

Block S502: Bond each static picture frame respectively with the static original picture to generate a picture sequence.

In the embodiment, the static original picture bonded with each of the static picture frames is a same static original picture. Alternatively, the number of the static original pictures bonded with the static picture frames is the same as that of the static picture frames. Each static original picture is respectively bond with each static picture frame to generate multiple static pictures.

The size of each of the above static picture frames is processed to make the size of them fit the static original picture, and each of the static picture frames is respectively bond with the static original picture to form multiple static pictures. The generated multiple static pictures form a picture sequence. The borders of the picture frame are taken as the borders of the picture sequence, and the picture elements of the picture frame are taken as the background of the picture sequence.

Block S503: Form a FLASH dynamic picture.

The above picture sequence is combined to form the dynamic picture in the format of the FLASH.

Block S504: Add special switching effects between each frame of the dynamic picture.

The special switching effects, e.g., the previous frame of picture disappears in the format of a shutter, and the next frame of picture grows clear; e.g., the previous frame of picture disappears in the format of rotation, and the next frame of picture displays also in the format of rotation; e.g., the previous frame of picture disappears in the format of gradual shrinking, the next frame of picture displays in the format of gradual enlargement.

In accordance with embodiments of the present invention, the special switching effects have been added between each frame of picture, to make the dynamic effects of the dynamic picture more interesting, and to better show the personality of the user.

Based on the above method for processing pictures, embodiments of the present invention also provide a system for processing pictures. The system may make pictures possess a sense of action and good expressive force, and may better display the personality of the user.

Figure 6:
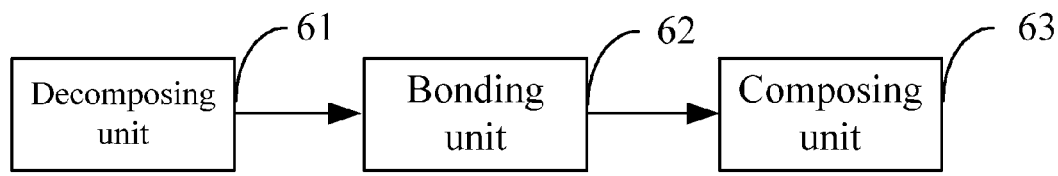
FIG. 6 is a block diagram illustrating a system for processing pictures in accordance with a fifth embodiment of the present invention.

With reference to FIG. 6, FIG. 6 is a block diagram illustrating a system for processing pictures in accordance with the fifth embodiment of the present invention. The system includes a decomposing unit 61, a bonding unit 62 and composing unit 63.

The decomposing unit 61 decomposes a selected dynamic picture frame into multiple frames, each of which is a static picture frame, and sends each static picture frame to the bonding unit 62. The decomposing unit 61 decomposes the selected dynamic picture frame into static picture frames, each of which includes borders and a picture element.

The bonding unit 62 bonds each static picture frame respectively with a static original picture to form a picture sequence, and sends the picture sequence to the composing unit 63. After being bonded, the borders of the picture frame are taken as the borders of the picture sequence, and the internal picture elements of the picture frame are taken as the background or complementary patterns of the picture sequence.

The composing unit 63 combines the bonded picture sequence to generate a dynamic picture. The composing unit 63 combines the above picture sequence, to generate a dynamic picture in the format of the GIF or FLASH.

In the embodiments of the present invention, a time attribute and size attribute of each static picture frame may be utilized, to make the formed dynamic picture more beautiful, coordinated, and have better visual effects.

In order to make the formed dynamic picture not distorted and deformed, the embodiments of the present invention process the borders and internal picture elements of each static picture frame through the picture frame adjusting unit.

Figure 7:
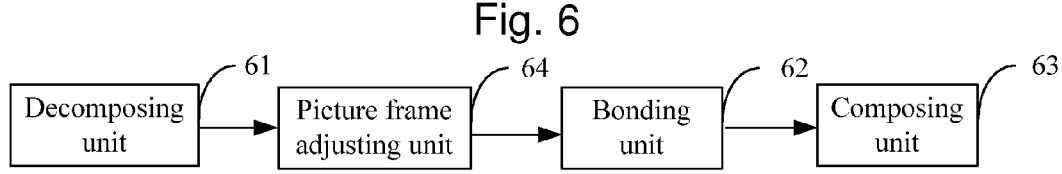
FIG. 7 is a block diagram illustrating a system for processing pictures in accordance with a sixth embodiment of the present invention.

With reference to FIG. 7, FIG. 7 is a block diagram illustrating a system for processing pictures in accordance with the sixth embodiment of the present invention. The system includes the decomposing unit 61, bonding unit 62, composing unit 63 and picture frame adjusting unit 64.

The picture frame adjusting unit 64 receives each static picture frame sent from the decomposing unit 61, separates the borders of each static picture frame from the internal picture elements, respectively processes the size of the borders and the internal picture elements of each static picture frame to make them fit the size of the static original picture corresponding to each static picture frame, and then sends the processed borders and internal picture elements to the bonding unit 62.

The picture frame adjusting unit 64 separates the four borders of each static picture frame and the internal picture elements into several relatively independent parts, e.g., three parts which are respectively the length borders, width borders and internal picture elements. And then the picture frame adjusting unit 64 processes the size of each of the borders to make it fit the size of the static original picture. For example, if the picture frame is reduced, the internal picture elements are reduced according to the larger proportion. If the picture frame is enlarged, the internal picture elements are enlarged according to the smaller proportion.

Detailed descriptions are provided in the foregoing, to describe the method and system for processing the pictures in accordance with embodiments of the present invention. In the application, specific examples are applied to clarify the principle and implementing modes of the invention. Descriptions about the above embodiments are only used for understanding the method and main idea of the application. Meanwhile, persons having ordinary skill in the art may modify the specific implementing modes and application scope according to the idea of the invention. In view of above, contents of the specification should not be understood as the limitation to the present invention.

What is claimed is:

1. A method for processing pictures using a microprocessor, the method comprising:
   decomposing a dynamic picture frame into multiple static picture frames;
   separating two length borders, two width borders of each static picture frame from an internal picture element of the static picture frame after all of the multiple static picture frames are decomposed from the dynamic picture frame;
   enlarging or reducing the two length borders according to a first proportion to make the length of each length border equal to that of a length edge of a static original picture, enlarging or reducing the two width borders according to a second proportion to make the length of each width border equal to that of a width edge of the static original picture, and enlarging or reducing the internal picture element according to the first proportion or the second proportion;
   bonding the adjusted two length borders, two width borders, and internal picture elements of each static picture frame respectfully with the static original picture, to generate a static picture; and
   forming a dynamic picture with multiple static pictures.

2. The method according to claim 1, further comprising:
   forming a picture sequence with the multiple static pictures; and wherein
   forming the dynamic picture with the multiple static pictures comprises
   forming the dynamic picture with the picture sequence.

3. The method according to claim 2, further comprising:
   recording a time attribute of each of the static picture frames; and
   adding the time attribute of each of the static picture frames to a time attribute of each of the static pictures in the dynamic picture.

4. The method according to claim 2, further comprising:
   recording a size attribute of each of the static picture frames;
   selecting the maximum size from the size attribute of each of the static picture frames; and
   taking the maximum size as the size of the first frame of the dynamic picture.

5. The method according to claim 1, wherein the dynamic picture is in the format of FLASH or Graphics Interchange Format (GIF).

6. The method according to claim 5, further comprising:
   adding special switching effects between each static picture forming the dynamic picture when the dynamic picture is in the format of the FLASH.

7. The method according to claim 1, wherein
   the static original picture bonded with each of the static picture frames is a same static original picture; and
   when there is at least one static original picture bonded with the static picture frames, the number of the at least one static original picture is the same as that of the static picture frames.

8. A system for processing pictures, comprising:
   a decomposing unit, configured to decompose a dynamic picture frame into multiple static picture frames;

a picture frame adjusting unit, configured to (i) separate two length borders, two width borders of each static picture frame from an internal picture element of the static picture frame after all of the multiple static picture frames are decomposed from the dynamic picture frame, (ii) enlarge or reduce the two length borders according to a first proportion to make the length of each length border equal to that of a length edge of a static original picture, (iii) enlarge or reduce the two width borders according to a second proportion to make the length of each width border equal to that of a width edge of the static original picture, and (iv) enlarge or reduce the internal picture elements according to the first proportion or the second proportion;

a bonding unit, configured to bond the two adjusted length borders, two width borders, and internal picture element of each static picture frame respectfully with the static original picture, to generate a static picture; and a composing unit, configured to form a dynamic picture with multiple static pictures.

9. The system according to claim 8, wherein the dynamic picture is in the format of FLASH or Graphics Interchange Format (GIF).

10. The system according to claim 8, wherein the bonding unit is further configured to form a picture sequence with the static pictures; and the composing unit is further configured to form the dynamic picture with the picture sequence.

11. The system according to claim 8, wherein the static original picture bonded with each of the static picture frames is a same static original picture; and when there is at least one static original picture bonded with the static picture frames, the number of the at least one static original picture is the same as that of the static picture frames.

* * * * *